(12) United States Patent
Bradford et al.

(10) Patent No.: US 7,707,396 B2
(45) Date of Patent: Apr. 27, 2010

(54) DATA PROCESSING SYSTEM, PROCESSOR AND METHOD OF DATA PROCESSING HAVING IMPROVED BRANCH TARGET ADDRESS CACHE

(75) Inventors: Jeffrey P. Bradford, Rochester, MN (US); Richard W. Doing, Raleigh, NC (US); Richard J. Eickemeyer, Rochester, MN (US); Wael R. El-Essawy, Austin, TX (US); Douglas R. Logan, Austin, TX (US); Balaram Sinharoy, Poughkeepsie, NY (US); William E. Speght, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 11/561,002

(22) Filed: Nov. 17, 2006

(65) Prior Publication Data

US 2008/0120496 A1    May 22, 2008

(51) Int. Cl.
*G06F 9/00* (2006.01)
*G06F 9/44* (2006.01)
*G06F 7/38* (2006.01)

(52) U.S. Cl. ...................... 712/238; 712/239

(58) Field of Classification Search .............. 712/239, 712/238
See application file for complete search history.

(56) References Cited

U.S. PATENT DOCUMENTS

| 5,687,338 | A | * | 11/1997 | Boggs et al. | 712/205 |
| 5,752,014 | A | | 5/1998 | Mallick et al. | |
| 5,901,307 | A | | 5/1999 | Potter et al. | |
| 6,721,877 | B1 | * | 4/2004 | Chen et al. | 712/239 |
| 6,732,260 | B1 | * | 5/2004 | Wang et al. | 712/237 |
| 2002/0144101 | A1 | * | 10/2002 | Wang et al. | 712/240 |

\* cited by examiner

*Primary Examiner*—Niketa I Patel
*Assistant Examiner*—Jesse R Moll
(74) *Attorney, Agent, or Firm*—Dillon & Yudell LLP

(57) ABSTRACT

A processor includes an execution unit and instruction sequencing logic that fetches instructions for execution. The instruction sequencing logic includes a branch target address cache having a branch target buffer containing a plurality of entries each associating at least a portion of a branch instruction address with a predicted branch target address. The branch target address cache accesses the branch target buffer using a branch instruction address to obtain a predicted branch target address for use as an instruction fetch address. The branch target address cache also includes a filter buffer that buffers one or more candidate branch target address predictions. The filter buffer associates a respective confidence indication indicative of predictive accuracy with each candidate branch target address prediction. The branch target address cache promotes candidate branch target address predictions from the filter buffer to the branch target buffer based upon their respective confidence indications.

21 Claims, 6 Drawing Sheets

DATA PROCESSING SYSTEM, PROCESSOR AND METHOD OF DATA PROCESSING HAVING IMPROVED BRANCH TARGET ADDRESS CACHE

BACKGROUND OF THE INVENTION

1. Technical Field

The present invention relates in general to data processing and, in particular, to branch prediction. Still more particularly, the present invention relates to a data processing system, processor and method of data processing having an improved branch target address cache (BTAC).

2. Description of the Related Art

A state-of-the-art microprocessor can comprise, for example, a cache for storing instructions and data, an instruction sequencing unit for fetching instructions from the cache, ordering the fetched instructions, and dispatching the fetched instructions for execution, one or more sequential instruction execution units for processing sequential instructions, and a branch processing unit (BPU) for processing branch instructions.

Branch instructions executed by the BPU can be classified as either conditional or unconditional branch instructions. Unconditional branch instructions are branch instructions that change the flow of program execution from a sequential execution path to a specified target execution path and which do not depend upon a condition supplied by the occurrence of an event. Thus, the branch specified by an unconditional branch instruction is always taken. In contrast, conditional branch instructions are branch instructions for which the indicated branch in program flow may be taken or not taken depending upon a condition within the processor, for example, the state of specified condition register bits or the value of a counter.

Conditional branch instructions can be further classified as either resolved or unresolved, based upon whether or not the condition upon which the branch depends is available when the conditional branch instruction is evaluated by the BPU. Because the condition upon which a resolved conditional branch instruction depends is known prior to execution, resolved conditional branch instructions can typically be executed and instructions within the target execution path fetched with little or no delay in the execution of sequential instructions. Unresolved conditional branches, on the other hand, can create significant performance penalties if fetching of sequential instructions is delayed until the condition upon which the branch depends becomes available and the branch is resolved.

Therefore, in order to minimize execution stalls, some processors speculatively predict the outcomes of unresolved branch instructions as taken or not taken. Utilizing the result of the prediction, the fetcher is then able to fetch instructions within the speculative execution path prior to the resolution of the branch, thereby avoiding a stall in the execution pipeline in cases in which the branch is subsequently resolved as correctly predicted. Conventionally, prediction of unresolved conditional branch instructions has been accomplished utilizing static branch prediction, which predicts resolutions of branch instructions based upon criteria determined prior to program execution, or utilizing dynamic branch prediction, which predicts resolutions of branch instructions by reference to branch history accumulated on a per-address basis within a branch history table (BHT) and/or branch target address cache (BTAC).

Modern microprocessors require several cycles to fetch instructions from the instruction cache, scan the fetched instructions for branches, and predict the outcome of unresolved conditional branch instructions. If any branch is predicted as taken, instruction fetch is redirected to the new, predicted address. This process of changing which instructions are being fetched is called a "taken branch redirect". During the several cycles required for the instruction fetch, branch scan, and taken branch redirect, instructions continue to be fetched along the not taken path; in the case of a predicted-taken branch, the instructions within the predicted-taken path are discarded, resulting in decreased performance and wasted power dissipation.

Several existing approaches are utilized to reduce or to eliminate the branch redirect penalty. One commonly used method to reduce branch redirect penalty is to fetch instructions ahead and place them into an instruction buffer; however, if the buffer is empty, for example, due to a branch misprediction, an instruction cache miss, or too many taken branches in quick succession, then part or all of the instruction pipeline may go idle, decreasing performance.

A less common method to reduce the performance loss due to taken branches is the implementation of a BTAC that caches the branch target addresses of taken branches in association with the branch instruction's fetch address. In operation, the BTAC is accessed in parallel with the instruction fetch and is searched for an entry whose instruction fetch address matches the fetch address transmitted to the instruction cache. If such a BTAC entry exists, instruction fetch is redirected to the branch target address provided in the matching BTAC entry. Because the BTAC access typically takes fewer cycles than the instruction fetch, branch scan, and taken branch redirect sequence, a correct BTAC prediction can improve performance by causing instruction fetch to begin at a new address sooner than if there were no BTAC present.

SUMMARY OF THE INVENTION

The present invention provides an improved data processing system, processor and method of data processing employing an enhanced branch target address cache.

A processor includes an execution unit and instruction sequencing logic that fetches instructions for execution. The instruction sequencing logic includes a branch target address cache having a branch target buffer containing a plurality of entries each associating at least a portion of a branch instruction address with a predicted branch target address. The branch target address cache accesses the branch target buffer using a branch instruction address to obtain a predicted branch target address for use as an instruction fetch address. The branch target address cache also includes a filter buffer that buffers one or more candidate branch target address predictions. The filter buffer associates a respective confidence indication indicative of predictive accuracy with each candidate branch target address prediction. The branch target address cache promotes candidate branch target address predictions from the filter buffer to the branch target buffer based upon their respective confidence indications.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
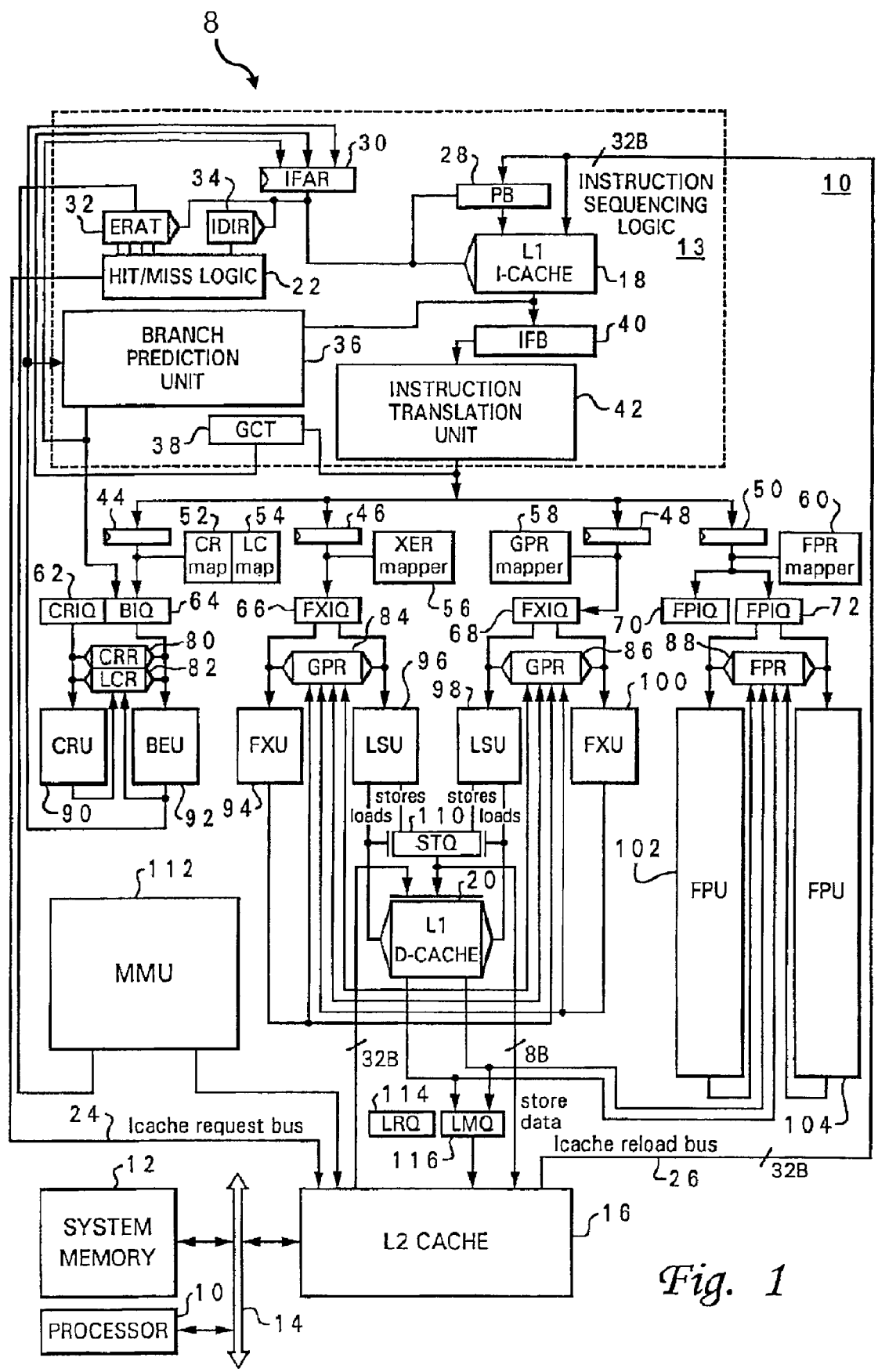
FIG. 1 is an exemplary embodiment of a data processing system in accordance with the present invention.

With reference now to FIG. 1, there is illustrated a high level block diagram of an exemplary data processing system 8 in accordance with the present invention. As shown, data processing system 8 includes a processor 10 comprising a single integrated circuit superscalar processor, which, as discussed further below, includes various execution units, registers, buffers, memories, and other functional units that are all formed by integrated circuitry. Processor 10 may be coupled to other devices, such as a system memory 12 and a second processor 10, by an interconnect fabric 14 to form a data processing system 8 such as a workstation or server computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a cache line of instructions to be fetched from L1 I-cache 18 for processing. During each cycle, a new instruction fetch address may be loaded into IFAR 30 from one of at least three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. The effective address loaded into IFAR 30 is selected from among the addresses provided by the multiple sources according to a prioritization scheme, which may take into account, for example, the relative priorities of the sources presenting addresses for selection in a given cycle and the age of any outstanding unresolved conditional branch instructions.

If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 or elsewhere within processor 10 based upon recent access patterns. In response to a request address, L2 cache 16 outputs a cache line of instructions, which are loaded into prefetch buffer (PB) 28 and L1 I-cache 18 via I-cache reload bus 26, possibly after passing through predecode logic (not illustrated).

Once the cache line specified by the EA in IFAR 30 resides in L1 cache 18, L1 I-cache 18 outputs the cache line to both branch prediction unit (BPU) 36 and to instruction fetch buffer (IFB) 40. As described further below with respect to FIG. 2, BPU 36 scans the cache line of instructions for branch instructions and predicts the outcome of conditional branch instructions, if any. Following a branch prediction, BPU 36 finishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more registers within a register file by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. In some embodiments, the instructions are also maintained in issue queues 62-72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90-104 is preferably implemented as an execution pipeline having a number of pipeline stages.

During execution within one of execution units 90-104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, BPU 36 updates its prediction facilities, if necessary. If, however, the calculated path address does not match the predicted path address, BEU 92 supplies the correct path address to IFAR 30, and BPU 36 updates its prediction facilities, as described further below. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

Figure 2:
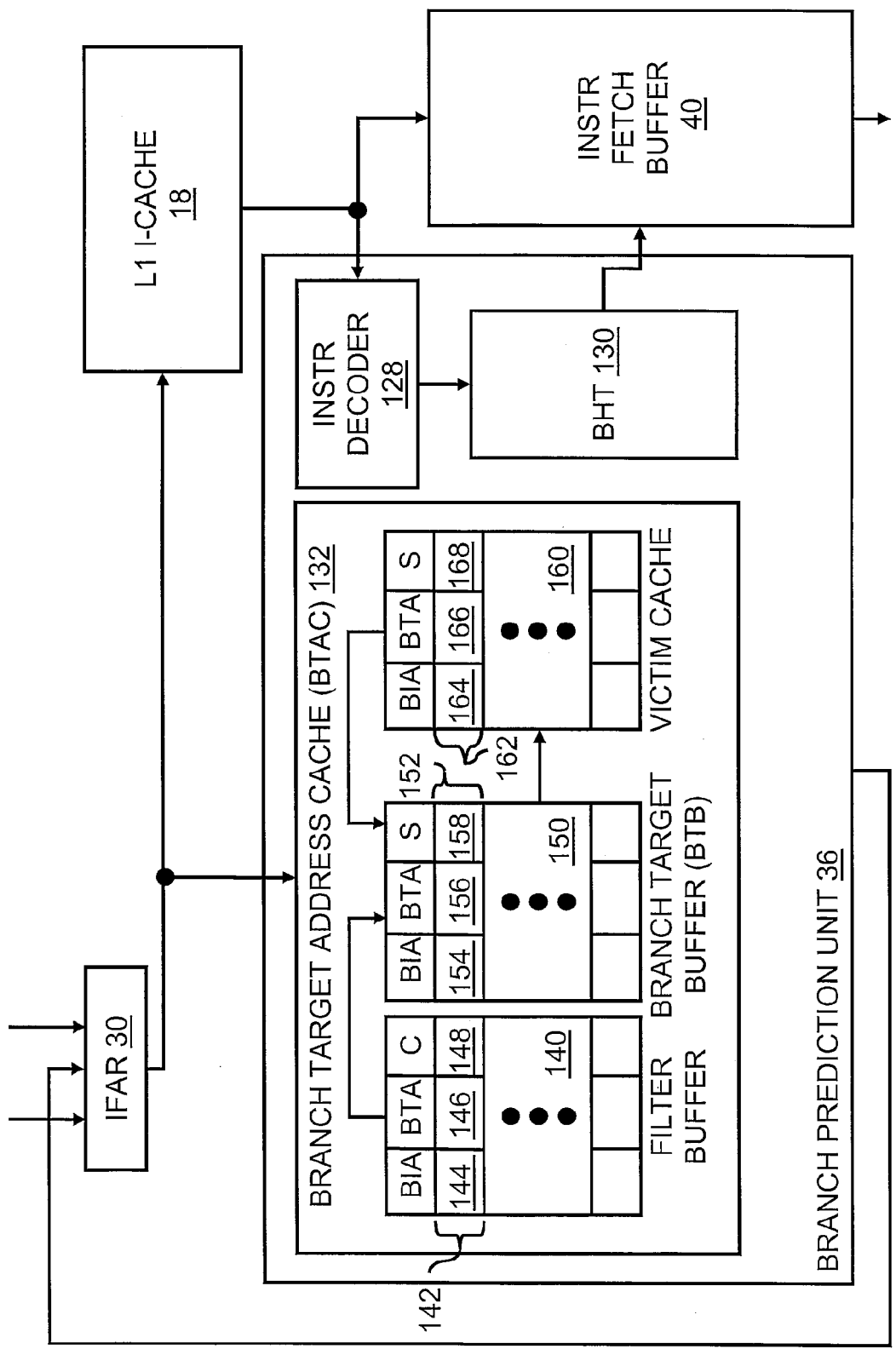
FIG. 2 is a more detailed block diagram of the branch prediction unit within the data processing system of FIG. 1.

Referring now to FIG. 2, there is depicted a more detailed block diagram of an exemplary embodiment of branch prediction unit 36 of FIG. 1 in relation to other components of instruction sequencing logic 13. In the illustrated embodiment, branch prediction unit 36 includes an instruction decoder 128, branch direction prediction circuitry, such as branch history table (BHT) 130, and branch target address prediction circuitry, such as branch target address cache (BTAC) 132. In alternative embodiments of the present invention, the branch direction prediction circuitry can be implemented with static branch prediction circuitry or two-level dynamic branch prediction circuitry.

Instruction decoder 128 is coupled to receive each cache line of instructions as it is fetched from L1 I-cache 18 and placed in instruction fetch buffer 40. Instruction decoder 128 scans each cache line of instructions for branch instructions, and in response to detecting a branch instruction, forwards the branch instruction to the branch direction prediction circuitry (e.g., BHT 130) for direction prediction. As further indicated by the connection between BHT 130 and instruction fetch buffer 40, in the event BTAC 132 invokes fetching along a path that BHT 130 predicts as not-taken, BHT 130 cancels the instructions in the incorrect path from instruction fetch buffer 40 and redirects fetching along the sequential path.

As shown, BTAC 132 includes a filter buffer 140, a branch target buffer (BTB) 150 coupled to filter buffer 140, and a victim cache 160 coupled to BTB 150. Filter buffer 140 includes multiple entries 142, each including a branch instruction address (BIA) field 144 for storing at least a tag portion of a BIA, a branch target address (BTA) field 146 for storing a BTA, and a confidence (C) field 148 indicating a confidence in the correctness of the BTA. BTB 150 similarly includes a number of entries 152. In a preferred embodiment, the number of entries 152 within BTB 150 is limited to a relatively small number (e.g., 8 or 16) to minimize the die area required to implement BTAC 132. Each entry 152 of BTB 150 includes a branch instruction address (BIA) field 154 for storing at least a tag portion of a BIA, a branch target address (BTA) field 156 for storing a BTA, and a score (S) field 158 indicating a score reflecting the historical accuracy of the BTA in BTA field 156. Victim cache 160, which buffers the contents of entries 152 evicted from BTB 150, includes a number of entries 172 that are formatted similarly to entries 162 of BTB 150 and contain a BIA field 164, a BTA field 166 and a score field 168.

In operation, filter buffer 140 captures and buffers "candidate" branch target predictions for possible inclusion in BTB 150. If the confidence in the accuracy of a candidate branch prediction is sufficiently high, as indicated by the associated confidence field 148, the entry is transferred from filter buffer 140 to BTB 150 for subsequent use in making branch target address predictions. As noted above, BTB 150 only has a limited number of entries 152. Consequently, as new entries 152 are entered into BTB 150, other entries 152 are evicted from BTB 150 and placed in victim cache 160 as victim cache entries 162. Victim cache entries 162 can either return to BTB 150, for example, in response to reuse of the victim cache entry 162, or be discarded when displaced by a subsequently evicted BTB entry 152. Further details regarding the operation of BTAC 132 are disclosed in FIGS. 3 and 4A-4C.

Figure 3:
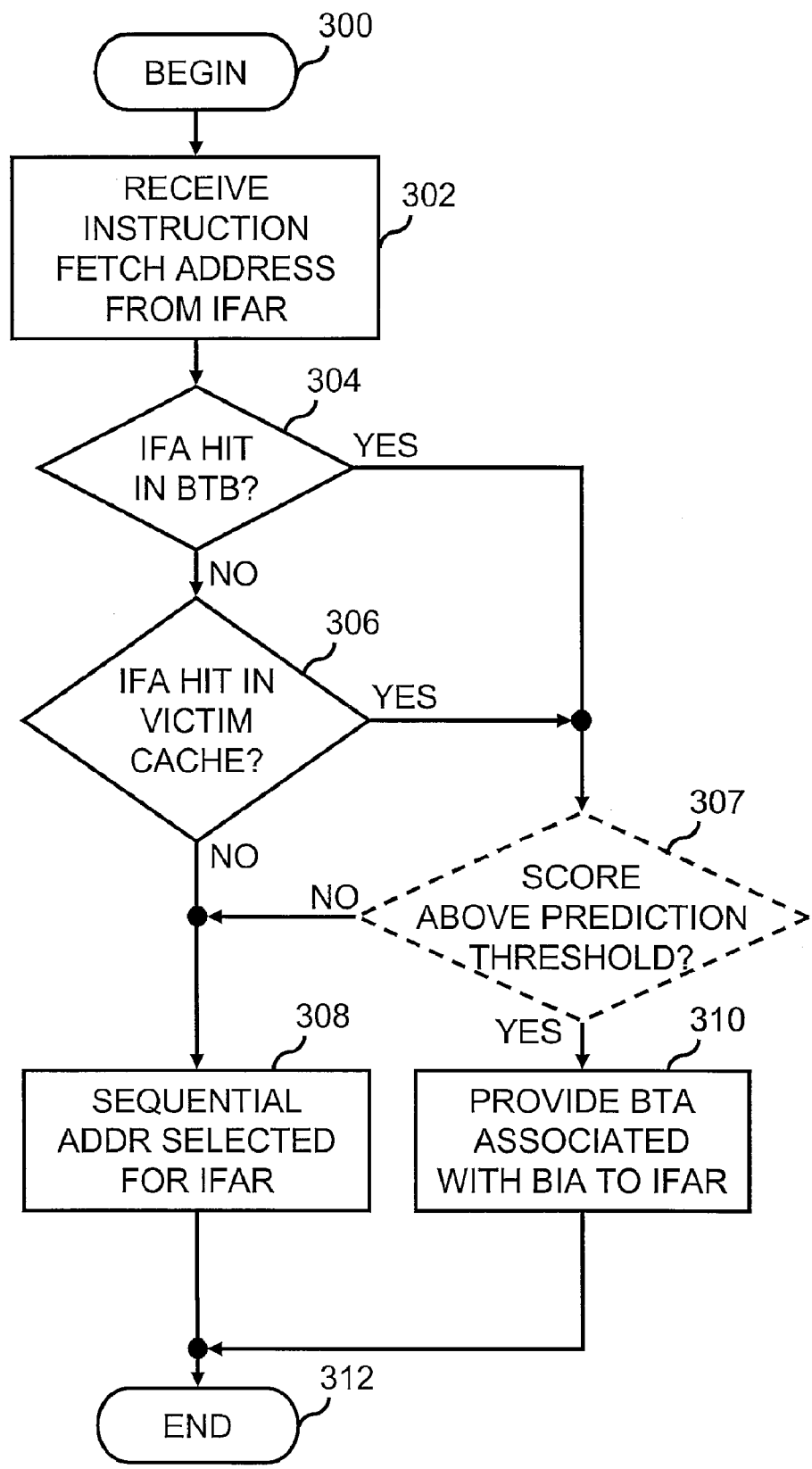
FIG. 3 is a high level logical flowchart of an exemplary method by which a Branch Target Address Cache (BTAC) within the branch prediction unit generates instruction fetch addresses in accordance with the present invention.

With reference now to FIG. 3, there is illustrated a high level logical flowchart of an exemplary method by which BTAC 132 generates instruction fetch addresses in accordance with the present invention. The depicted process begins at block 300 and then proceeds to block 302, which illustrates BTAC 132 receiving an instruction fetch address as the instruction fetch address is transmitted from IFAR 30 to L1

I-cache 18 to initiate an instruction fetch. In response to receipt of the instruction fetch address, BTAC 132 consults BTB 150 and victim cache 160 (possibly in parallel) to determine if the instruction fetch address hits in BTB 150 or victim cache 160, that is, whether the instruction fetch address matches any of the BIAs (or tag portions thereof) contained in fields 154, 164 of entries 152, 162 (blocks 304 and 306). If not, the process proceeds to block 308, which is described below. However, in response to a determine at either block 304 or block 306 that the instruction fetch address hit in either BTB 150 or victim cache 160, the process passes in some embodiments directly to block 310, which is described below, and in alternative embodiments to optional block 307.

Block 307 depicts a determination of whether or not score field 158 of the matching entry 152 or 162 exceeds a prediction threshold (e.g., 1) determinative of whether the accuracy of the branch target address prediction contained in the matching entry is sufficiently high to warrant its use to redirect instruction fetching. As will be appreciated, different prediction thresholds can be applied to BTB 150 and 160. In response to a negative determination at block 307, the process passes to block 308, which is described below. If, however, BTAC 132 determines at block 307 that the score indicated by score field 158 of the matching entry 152 exceeds the prediction threshold, the process passes to block 310, which illustrates BTAC 132 supplying the BTA from the BTA field 156, 166 of the matching entry 152, 162 to IFAR 30 to initiate fetching along the taken path associated with the BIA.

Referring now to block 308, in response to negative determinations at both of blocks 304 and 306 or in response to a negative determination at optional block 307, the sequential address of the next cache line of instructions is selected by IFAR 30 as the next instruction fetch address, as depicted at block 308. Following block 308 or block 310, the process illustrated in FIG. 3 terminates until a next instruction fetch address is received by BTAC 132.

Figure 4A:
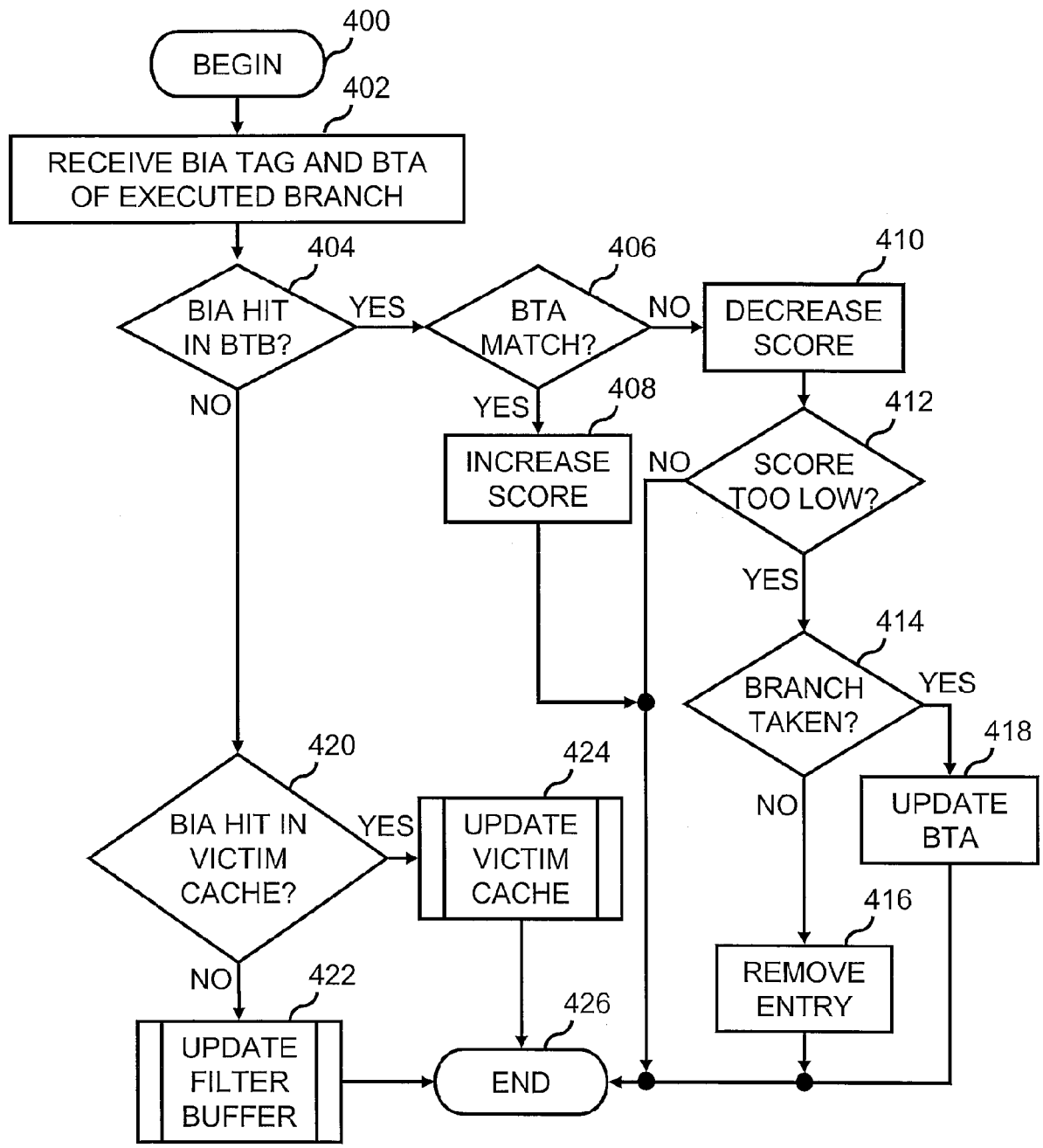
FIG. 4 is a high level logical flowchart of an exemplary method by which the branch target address predictions within the BTAC are updated in accordance with the present invention.
Figure 4B:
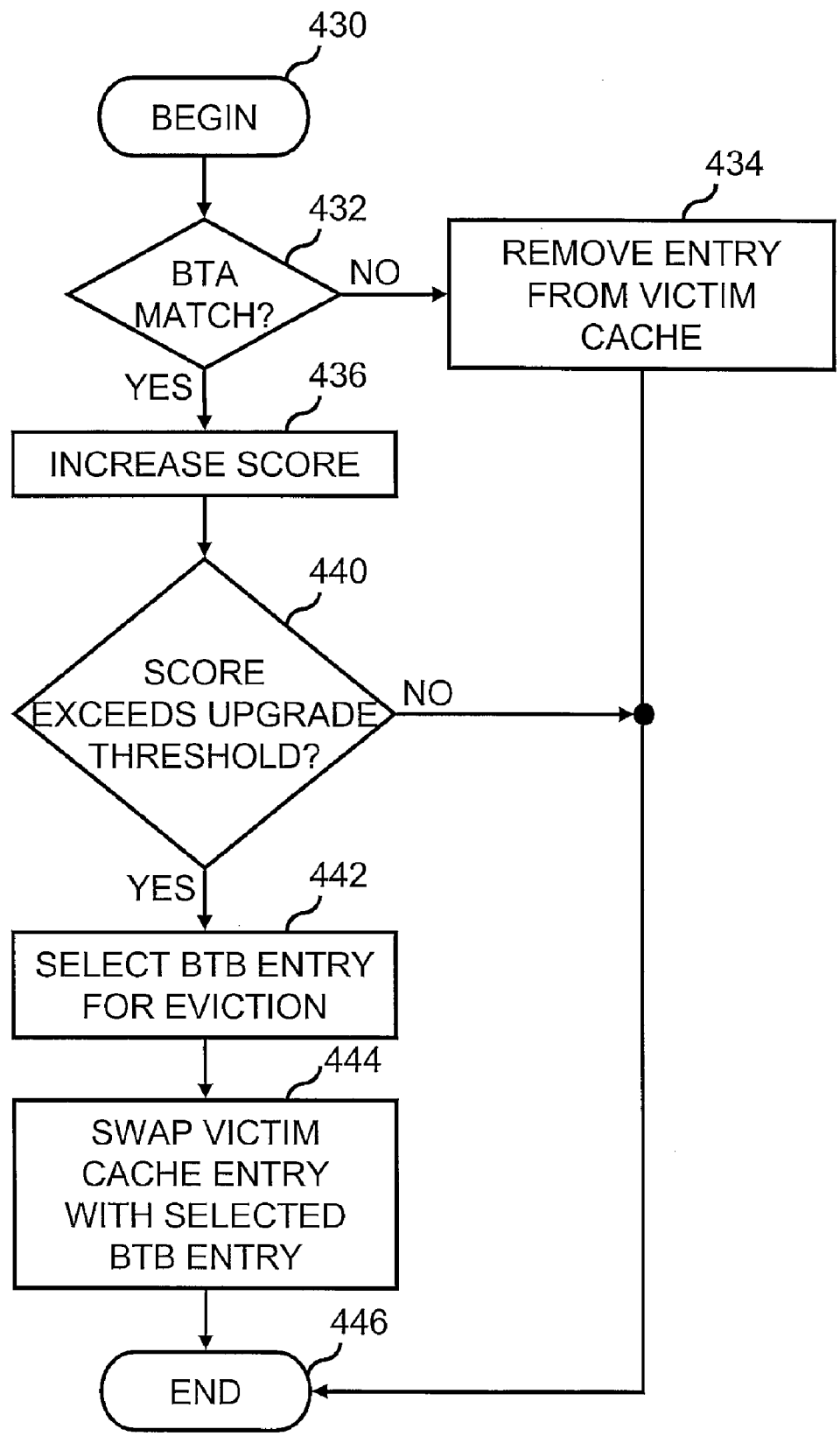
Figure 4C:
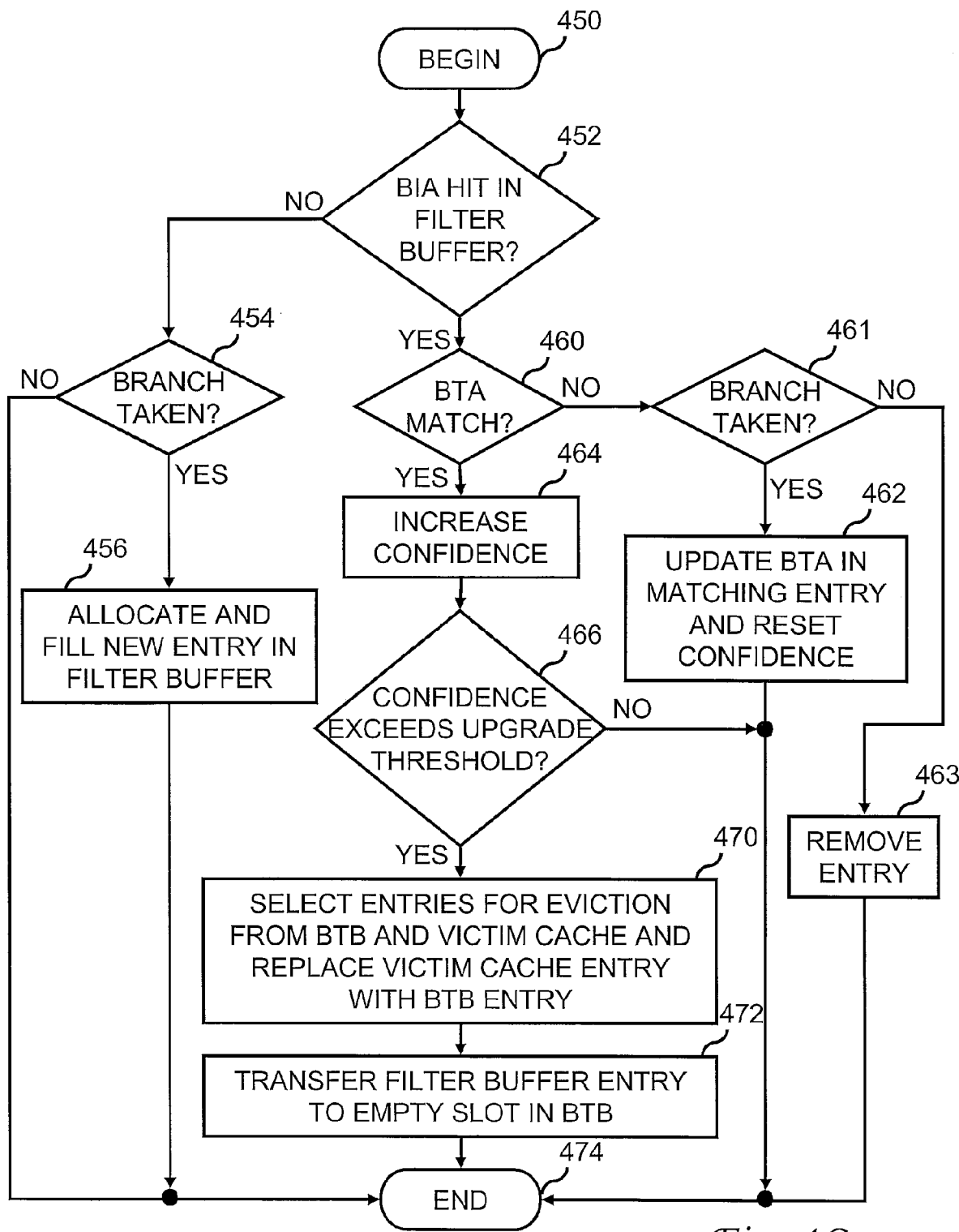

Referring now to FIGS. 4A-4C, there are illustrated high level logical flowcharts that together depict an exemplary method by which the branch target address predictions within BTAC 132 are updated in accordance with the present invention. The process begins at block 400 of FIG. 4A and then passes block 402, which depicts BTAC 132 receiving a BIA tag and the BTA of an executed branch instruction from BEU 92. In response to receipt of the BIA tag and BTA, BTAC 132 consults BTB 150 and victim cache 160 (possibly in parallel), as shown at blocks 404 and 420, to determine if the BIA tag hits in BTB 150 or victim cache 160, that is, whether the BIA tag matches any of the BIAs (or tag portions thereof) contained in fields 154, 164 of entries 152, 162. In response to a determination at block 404 that the BIA tag supplied by BEU 92 hits in an entry 152 of BTB 150, BTAC 132 further determines at block 406 whether the BTA specified in BTA field 156 of the matching entry 152 matches the BTA returned by BEU 92. If so, BTAC 132 increases the score indicated by score field 158 of the matching entry 152, as illustrated at block 408, to indicate increased certainty in the correctness of the branch target address prediction contained in the matching entry 152. For example, in an exemplary embodiment in which score field 158 is implemented as a saturating two-bit counter, score field 158 is incremented by one if it has less than the maximum value of 3. Thereafter the process terminates at block 426.

Returning to block 406, in response to a determination that the BTA specified in BTA field 156 of the matching entry 152 does not match the BTA returned by BEU 92, decreases the score indicated by score field 158 of the matching entry 152, as illustrated at block 410, to indicate decreased certainty in the correctness of the branch target address prediction contained in the matching entry 152. For example, in an exemplary embodiment in which score field 158 is implemented as a saturating two-bit counter, score field 158 may be decremented by one if it has a value greater than the minimum value of 0. Alternatively, score field 158 may simply be decremented to the minimum of value of 0 regardless of its current value. Furthermore, score field 158 may be decremented by differing amounts depending on the direction of the branch as reported by BEU 92.

Block 412 depicts BTAC 132 determining whether or not, following the decrease in the score illustrated at block 410, the score indicated in score field 158 has fallen below a predetermined minimum threshold for BTB 150. If not, the process terminates at block 426. If however, the score indicated by score field 158 has fallen below a predetermined minimum threshold, BTAC 132 checks in block 414 whether BEU 92 reports the branch as having been taken. If the branch was not taken, BTAC 132 removes entry 152 from BTB 150, as depicted at block 416, and the process terminates at block 426. If BTAC 132 determines in block 414 that the branch was reported as taken by BEU 92, BTAC 132 updates the BTA field 156 of entry 154 with the correct BTA. The process then terminates at block 426.

Referring again to block 420, in response to a determination that the BIA tag supplied by BEU 92 hits in a entry 162 of victim cache 160, the process passes to block 424, which illustrates BTAC 132 updating victim cache 160, as described further below with reference to FIG. 4C. If, however, BTAC 132 determines at block 420 that the BIA tag supplied by BEU 92 misses in both BTB 150 and victim cache 160, BTAC 132 updates filter buffer 140, as shown at block 422 and described in greater detail below with reference to FIG. 4B. Following either of blocks 422 or 424, the process terminates at block 426.

With reference now to FIG. 4B, the process of updating victim cache 150 as depicted at block 424 of FIG. 4A is shown in greater detail. The process shown in FIG. 4B begins at block 430 in response to a determination at block 420 of FIG. 4A that the BIA tag provided by BEU 92 hits in an entry 162 of victim cache 160. The process then proceeds to block 432, which illustrates BTAC 132 determining whether the BTA specified in BTA field 166 of the matching entry 162 matches the BTA returned by BEU 92. If not, meaning that the branch target address prediction contained in the matching entry 162 was incorrect, BTAC 132 removes the matching entry 162 from victim cache 160. Thereafter, the process terminates at block 446.

Returning to block 432, in response to a determination that the BTA specified in BTA field 166 of the matching entry 162 matches the BTA returned by BEU 92, BTAC 132 increases the score indicated by score field 168 of the matching entry 162, as illustrated at block 436. For example, in an exemplary embodiment in which score field 168 is implemented as a saturating two-bit counter, score field 168 is incremented by one if it has less than the maximum value of 3. The increased score indicates increased certainty in the correctness of the branch target address prediction contained in the matching entry 162. Following block 436, BTAC 132 determines at block 440 whether or not the score indicated by score field 168 exceeds an upgrade threshold applied to the victim cache 160, for example, the lowest score currently indicated by any of score fields 158 in BTB 150. In response to a negative determination at block 440, the process simply terminates at block 446. If, on the other hand, the score indicated by score field 168 of the matching entry 162 exceeds the upgrade threshold, the process proceeds to block 442.

Block 442 illustrates BTAC 132 selecting an entry 152 in BTB 150 for eviction. In an exemplary embodiment, the entry 152 in BTB 150 is selected among the entries 152 marked for replacement (by score fields 158 or otherwise) utilizing a predetermined replacement algorithm, such as least-recently used (LRU) or round robin. In embodiments in which the score is utilized to mark entries 152 as available for replacement, the replacement algorithm preferably first selects from a subset of entries 152 currently having the lowest score, or if that subset is empty, selects from a broader group of entries 152 having higher score values. Following block 442, BTAC 132 then swaps the matching entry 162 in victim cache 160 for the selected entry 152 in BTB 150, as shown at block 444. In this case, the certainty in the branch target address prediction is sufficiently high to restore it to BTB 150. Following block 444, the process terminates at block 446.

Referring now to FIG. 4C, the process of updating filter buffer 140 as depicted at block 422 of FIG. 4A is shown in greater detail. The process shown in FIG. 4C begins at block 450 in response to a determination at block 420 of FIG. 4A that the BIA tag provided by BEU 92 missed in both BTB 150 and victim cache 160. The process then proceeds to block 452, which illustrates BTAC 132 determining if the BIA tag received from BEU 92 hits in filter buffer 140, that is, whether the BIA tag matches any of the BIAs (or tag portions thereof) contained in fields 144 of entries 142. If not, BTAC 132 further determines at block 454 whether BEU 92 reports that the branch was taken. If so, BTAC 132 allocates a new entry 142 in filter buffer 140 and fills the new entry 142 with the BIA tag and BTA provided by BEU 92. As will be appreciated, the allocation of an entry 142 at block 456 may entail discarding an existing entry, which may be selected for example, utilizing an LRU or round robin replacement algorithm. Following block 456 or a negative determination at block 454, the process terminates at block 474.

Returning to block 452, in response to a determination that the BIA tag supplied by BEU 92 hits in an entry 142 of filter buffer 140, BTAC 132 further determines at block 460 whether the BTA specified in BTA field 146 of the matching entry 142 matches the BTA returned by BEU 92. If not, BTAC 132 checks the disposition of the branch as reported by BEU 92 (i.e., taken or not taken) at block 461. If the branch was taken, BTAC 132 updates BTA field 146 with the BTA provided by BEU 92 and resets confidence field 148. For example, in an exemplary embodiment in which confidence field 148 is implemented as a saturating two-bit counter, confidence field 148 is reset to 0. Thereafter, the process terminates at block 474. If at block 461, BTAC 132 determines that the BEU 92 reported the branch as not taken, BTAC 132 removes the entry 142 from filter buffer 140 (block 463), and the process terminates at block 474.

If, however, BTAC 132 determines at block 460 that the BTA specified in BTA field 146 of the matching entry 142 matches the BTA returned by BEU 92, BTAC 132 increases the value indicated by confidence field 148 of the matching entry 142, as illustrated at block 464, to indicate increased confidence in the correctness of the branch target address prediction contained in the matching entry 142. For example, in an exemplary embodiment in which confidence field 148 is implemented as a saturating two-bit counter, confidence field 148 is incremented by one if it has less than the maximum value of 3.

Following block 464, BTAC 132 determines at block 466 whether or not the value indicated by confidence field 148 exceeds an upgrade threshold applied to filter buffer 140 (e.g., 2). If not, the process terminates at block 474. If, on the other hand, the value indicated by confidence field 148 of the matching entry 142 exceeds the upgrade threshold, the process proceeds to block 470. Block 470 illustrates BTAC 132 selecting an entry 152 in BTB 150 and an entry 162 in victim cache 160 for eviction and replacing the selected entry 162 in victim cache 160 with the selected entry 152 in BTB 150. In an exemplary embodiment, the entry 152 in BTB 150 is selected among the entries 152 marked for replacement (by score fields 158 or otherwise) utilizing a predetermined replacement algorithm, such as LRU or round robin. The entry 162 in victim cache 160 can similarly be selected for eviction utilizing an LRU or round robin replacement algorithm. As depicted at block 472, BTAC 132 then transfers the matching entry 142 in filter buffer 140 into the empty slot in BTB 150 and initializes its score field 158. In this case, the confidence in the accuracy of the branch target address prediction is sufficiently high to place it in BTB 150 and utilize the branch target address prediction to generate future instruction fetch addresses.

In accordance with at least some embodiments of the present invention, the score to which BTAC 132 initializes the score field 158 of an entry 152 in BTB 150 at block 472 differ depending upon the associated type of branch instruction, which in such embodiments is indicated to BTAC 132 by BEU 92. For example, in the above exemplary embodiment in which score field 158 is implemented as a two-bit saturating counter, BTAC 132 can initialize the score field 158 for unconditional branches with fixed branch target addresses to a value of 3, the score field 158 for conditional branches with fixed branch target addresses to a value of 2, the score field 158 for unconditional branches with variable branch target addresses to a value of 1, and the score field 158 for conditional branches with variable target addresses to a value of 0. In other embodiments of the present invention, the score field 158 of each new entry 152 can simply be initialized to 0. In still other embodiments, the score field 158 of each new entry 152 can be initialized to the value of the confidence field 148 of the entry 142 in filter buffer 140 utilized to populate BTB 150. Following block 472, the process depicted in FIG. 4C terminates at block 474.

As has been described, the present invention provides a data processing system, processor and method of data processing in which an improved branch target address cache (BTAC) is utilized to generate branch target address predictions. In accordance with the present invention, one or both of a filter buffer and victim cache are employed in combination with a branch target buffer (BTB) in the BTAC. The victim cache reduces evictions of useful branch target address predictions from the BTAC for branches that are taken only a few times, and the filter buffer reduces pollution of the BTB with branch target address predictions for branches that are seldom taken. Each entry within the BTB preferably has an associated score indicative of the accuracy of the branch target address prediction provided by that entry. The score can be advantageously be considered in selecting an entry for eviction from the BTB.

While the invention has been particularly shown as described with reference to a preferred embodiment, it will be understood by those skilled in the art that various changes in form and detail may be made therein without departing from the spirit and scope of the invention.

What is claimed is:

1. A processor, comprising:
at least one execution unit that executes instructions; and
instruction sequencing logic, coupled to the at least one execution unit, that fetches instructions from a memory system for execution by the at least one execution unit, said instruction sequencing logic including a branch target address cache that outputs predicted branch target addresses for use as instruction fetch addresses, said branch target address cache including:
- a branch target buffer having a plurality of entries each associating at least a portion of a branch instruction address with a predicted branch target address, wherein said branch target address cache accesses the branch target buffer with at least a portion of a branch instruction address to obtain a predicted branch target address for use as an instruction fetch address; and
- a filter buffer, coupled to the branch target buffer, that buffers one or more candidate branch target address predictions for possible inclusion in the branch target buffer, said filter buffer associating a respective confidence indication indicative of predictive accuracy with each candidate branch target address prediction, wherein said branch target address cache promotes candidate branch target address predictions from the filter buffer to the branch target buffer based upon the respective confidence indications of the candidate branch target address predictions.

2. The processor of claim 1, wherein:
each entry in the branch target buffer has a respective associated score; and
the branch target address cache applies a replacement policy to the plurality of entries based upon the respective scores of the plurality of entries.

3. The processor of claim 1, wherein:
each entry in the branch target buffer has a respective associated score; and
the branch target address cache initializes a score of an entry among the plurality of entries to one of multiple possible scores based upon a type of branch instruction identified by said at least a portion of a branch instruction address contained in that entry.

4. The processor of claim 3, wherein the type of the branch instruction is one of a set including a conditional branch instruction and an unconditional branch instruction.

5. The processor of claim 3, wherein the type of the branch instruction is one of a set including a branch instruction with a fixed branch target address and a branch instruction with a variable branch target address.

6. The processor of claim 1, wherein:
each entry in the branch target buffer has a respective associated score; and
said instruction sequencing logic, responsive to receipt of a prior instruction fetch address, accesses the branch target buffer utilizing the prior instruction fetch address, and if a matching entry is found in the branch target buffer, utilizes the predicted branch target address of the matching entry as a next instruction fetch address only if the score of the matching entry is sufficient.

7. The processor of claim 1, wherein:
the at least one execution unit includes a branch execution unit that executes branch instructions;
the branch execution unit reports outcomes of executed branch instructions to the instruction sequencing logic; and
the branch target address cache adds new candidate branch target address predictions to the filter buffer based upon the reported outcomes of executed branch instructions.

8. The processor of claim 1, said branch target address cache further comprising a victim cache coupled to the branch target buffer, wherein the victim cache receives and buffers entries evicted from the branch target buffer.

9. The processor of claim 8, wherein:
each entry in the branch target buffer has a respective associated score;
each entry in the victim cache has a respective associated score; and
said branch target address cache transfers an entry from the victim cache back to the branch target buffer if the associated score is better than that of one of the plurality of entries in the branch target buffer.

10. The processor of claim 1, wherein:
the memory system includes a cache memory;
said processor includes the cache memory; and
the instruction sequencing logic accesses the branch target address cache and the cache memory concurrently with an instruction fetch address.

11. A data processing system, comprising:
the processor of claim 1;
an interconnect coupled to the processor; and
the memory system coupled to the interconnect.

12. A method of data processing in a processor including at least one execution unit and an instruction sequencing logic containing a branch target address cache, the branch target address cache including a branch target buffer and a filter buffer coupled to the branch target buffer, said method comprising:
- in the branch target buffer, buffering a plurality of entries each associating at least a portion of a branch instruction address with a predicted branch target address;
- accessing the branch target buffer with at least a portion of a branch instruction address to obtain a predicted branch target address and transmitting the predicted branch target address to a memory system as an instruction fetch address;
- in the filter buffer, buffering one or more candidate branch target address predictions for possible inclusion in the branch target buffer, said filter buffer associating a respective confidence indication indicative of predictive accuracy with each candidate branch target address prediction; and
- promoting candidate branch target address predictions from the filter buffer to the branch target buffer based upon the respective confidence indications of the candidate branch target address predictions.

13. The method of claim 12, wherein:
each entry in the branch target buffer has a respective associated score; and
the method further comprises applying a replacement policy to the plurality of entries based upon the respective scores of the plurality of entries.

14. The method of claim 12, wherein:
each entry in the branch target buffer has a respective associated score; and
the method further comprises initializing a score of an entry among the plurality of entries to one of multiple possible scores based upon a type of branch instruction identified by said at least a portion of a branch instruction address contained in that entry.

15. The method of claim 14, wherein the type of the branch instruction is one of a set including a conditional branch instruction and an unconditional branch instruction.

16. The method of claim 14, wherein the type of the branch instruction is one of a set including a branch instruction with a fixed branch target address and a branch instruction with a variable branch target address.

17. The method of claim 12, wherein:
each entry in the branch target buffer has a respective associated score; and said method further comprises:

in response to receipt of a prior instruction fetch address, the instruction sequencing logic accessing the branch target buffer utilizing the prior instruction fetch address; and if a matching entry is found in the branch target buffer, utilizing the predicted branch target address of the matching entry as a next instruction fetch address oniy if the score of the matching entry is sufficient.

18. The method of claim 12, wherein:

the at least one execution unit includes a branch execution unit that executes branch instructions;

said method further comprising:

the branch execution unit reporting outcomes of executed branch instructions to the instruction sequencing logic; and the branch target address cache adding new candidate branch target address predictions to the filter buffer based upon the reported outcomes of executed branch instructions.

19. The method of claim 12, wherein:

said branch target address cache further comprising a victim cache coupled to the branch target buffer; and said method further comprising the victim cache receiving and buffering entries evicted from the branch target buffer.

20. The method of claim 19, wherein:

each entry in the branch target buffer has a respective associated score;

each entry in the victim cache has a respective associated score; and said method further comprises:

said branch target address cache transferring an entry from the victim cache back to the branch target buffer if the associated score is better than that of one of the plurality of entries in the branch target buffer.

21. The method of claim 12, wherein:

the memory system includes a cache memory;

said method further comprising accessing the branch target address cache and the cache memory concurrently utilizing the instruction fetch address.

* * * * *